United States Patent
Lee et al.

(10) Patent No.: US 8,738,067 B2
(45) Date of Patent: May 27, 2014

(54) METHOD AND APPARATUS FOR CONTROLLING TRANSMIT POWER OF BASE STATION IN A WIRELESS COMMUNICATION SYSTEM

(75) Inventors: In-Taek Lee, Seoul (KR); Byoung-Ha Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 613 days.

(21) Appl. No.: 13/027,780

(22) Filed: Feb. 15, 2011

(65) Prior Publication Data

US 2011/0201378 A1    Aug. 18, 2011

(30) Foreign Application Priority Data

Feb. 18, 2010 (KR) ......................... 10-2010-0014474

(51) Int. Cl.
*H04B 7/00* (2006.01)

(52) U.S. Cl.
USPC ....... 455/522; 455/127.1; 455/69; 455/67.13; 455/13.4; 370/252; 370/318

(58) Field of Classification Search
USPC ........ 455/444, 422.1, 517, 574, 343.1, 127.1, 455/69, 522, 572, 68, 500, 67.11, 67.13, 455/524, 525, 13.4, 452.1, 452, 501; 370/252, 311, 342, 204, 335, 318, 340, 370/437, 468; 375/267, 144

See application file for complete search history.

(56) References Cited

U.S. PATENT DOCUMENTS

| | | | | |
|---|---|---|---|---|
| 5,485,486 A | * | 1/1996 | Gilhousen et al. | 370/335 |
| 5,590,409 A | * | 12/1996 | Sawahashi et al. | 455/69 |
| 5,715,526 A | * | 2/1998 | Weaver et al. | 455/126 |
| 5,881,368 A | * | 3/1999 | Grob et al. | 455/69 |
| 2010/0208675 A1 | * | 8/2010 | Song et al. | 370/329 |
| 2013/0183985 A1 | * | 7/2013 | Park et al. | 455/444 |

* cited by examiner

*Primary Examiner* — Sujatha Sharma
(74) *Attorney, Agent, or Firm* — Jefferson IP Law, LLP

(57) ABSTRACT

A method and apparatus for controlling the transmit power of a mobile BS in a wireless communication system are provided. The method includes determining a measurement value for determining if a noise power level is higher than an interference power level, when the measurement value is higher than a threshold value, determining that the noise power level is higher than the interference power level, and, when it is determined that the noise power level is higher than the interference power level, increasing transmit power.

30 Claims, 8 Drawing Sheets

< COVERAGE OVERLAY BETWEEN TWO MOBILE BSS >

< COVERAGE OVERLAY BETWEEN TWO MOBILE BSS >

< COVERAGE OVERLAY FOR OBTAINING C1 AREA >

< COVERAGE OVERLAY FOR OBTAINING C1 AREA >

METHOD AND APPARATUS FOR CONTROLLING TRANSMIT POWER OF BASE STATION IN A WIRELESS COMMUNICATION SYSTEM

PRIORITY

This application claims the benefit under 35 U.S.C. §119 (a) of a Korean patent application filed in the Korean Intellectual Property Office on Feb. 18, 2010 and assigned Serial No. 10-2010-0014474, the entire disclosure of which is hereby incorporated by reference.

BACKGROUND OF THE INVENTION

1. Field of the Invention

The present invention relates to the transmit power of a wireless communication system. More particularly, the present invention relates to a method and apparatus for controlling the transmit power of a mobile Base Station (BS) in a wireless communication environment.

2. Description of the Related Art

In the construction of a cellular communication system, cell planning is used to determine points where BSs are to be deployed in order to maximize efficiency while minimizing costs. That is, cell planning is used to determine BS deployment points based on a transmit/receive power strength analysis, a test call generation function analysis, a cell coverage analysis and diagnosis, an operation environment analysis, an inter-BS interference analysis, a local feature dependent propagation characteristic analysis, and the like.

Generally, in a cellular communication system, a fixed BS is installed and operated in the outdoors to maintain a service coverage area centered on the BS deployment point that is determined based on the cell planning. That is, during network design for the outdoor installation of the fixed BS, cells are classified diversely in size according to a peripheral topography or feature, the number of users, etc. and the cellular communication system is adaptively operated. Prior to BS deployment, a Code Division Multiple Access (CDMA) system or Worldwide Interoperability for Microwave Access (WiMAX)-class system that is now in commercial use determines a BS position based on the maximum transmit power of a fixed BS such that the fixed BS has the maximum capacity within a certain coverage area through network design of a network optimization process.

On the other hand, in a military communication environment, a location for deployment of a fixed BS cannot be determined because military units are mobile and can move to various regions such as a training region, whereas a legacy power control technique determines a position of a BS to have the maximum capacity within a fixed coverage area based on the maximum transmit power. In other words, a legacy power control technique cannot be used in the military communication environment where BSs in addition to user Mobile Stations (MSs) are mobile. For example, a wireless environment suffers a substantial change according to a position of a BS and therefore, in case that all BSs identically transmit downlink data to an MS at the maximum transmit power as in the general cellular communication system, in a situation in which mobile BSs neighbor one another, two BSs act as substantial interference to each other, thus resulting in the deterioration of system performance.

As described above, in case that a mobile BS transmits at the maximum transmit power without transmit power control and without considering a peripheral wireless environment, it can result in substantial interference in a legacy network.

Accordingly, there is a need for a method and apparatus for controlling the transmit power of a mobile BS in a wireless communication system.

SUMMARY OF THE INVENTION

An aspect of the present invention is to address at least the above problems and/or disadvantages and to provide at least the advantages described below. Accordingly, an aspect of the present invention is to provide a method and apparatus for controlling the transmit power of a mobile Base Station (BS) in a wireless communication system.

Another aspect of the present invention is to provide a method and apparatus for preventing a decrease in system capacity and coverage resulting from interference that can happen in a mobile BS transmitting at the maximum transmit power in a wireless communication system.

A further aspect of the present invention is to provide a method and apparatus for maximizing coverage in a wireless communication system including a mobile BS.

The above aspects are achieved by providing a method and apparatus for controlling the transmit power of a mobile BS in a wireless communication system.

In accordance with an aspect of the present invention, a method for controlling the transmit power of a mobile BS in a wireless communication system is provided. The method includes determining a measurement value for determining if a noise power level is higher than an interference power level, when the measurement value is higher than a threshold value, determining that the noise power level is higher than the interference power level, and, when it is determined that the noise power level is higher than the interference power level, increasing transmit power.

In accordance with another aspect of the present invention, an apparatus for controlling the transmit power of a mobile BS in a wireless communication system is provided. The apparatus includes a parameter determiner and a power control determiner. The parameter determiner determines a measurement value for determining if a noise power level is higher than an interference power level. When the measurement value is higher than a threshold value, the power control determiner determines that the noise power level is higher than the interference power level. When it is determined that the noise power level is higher than the interference power level, the power control determiner increases transmit power.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An exemplary method and apparatus for controlling the transmit power of a mobile Base Station (BS) in a wireless communications system according to the present invention are described below. More particularly, an exemplary technique for controlling the transmit power of a mobile BS through conditional formulas for determining the maximum coverage according to the present invention is described below.

The conditional formulas for determining the maximum coverage are derived below with reference to FIGS. 1 to 5.

Figure 1:
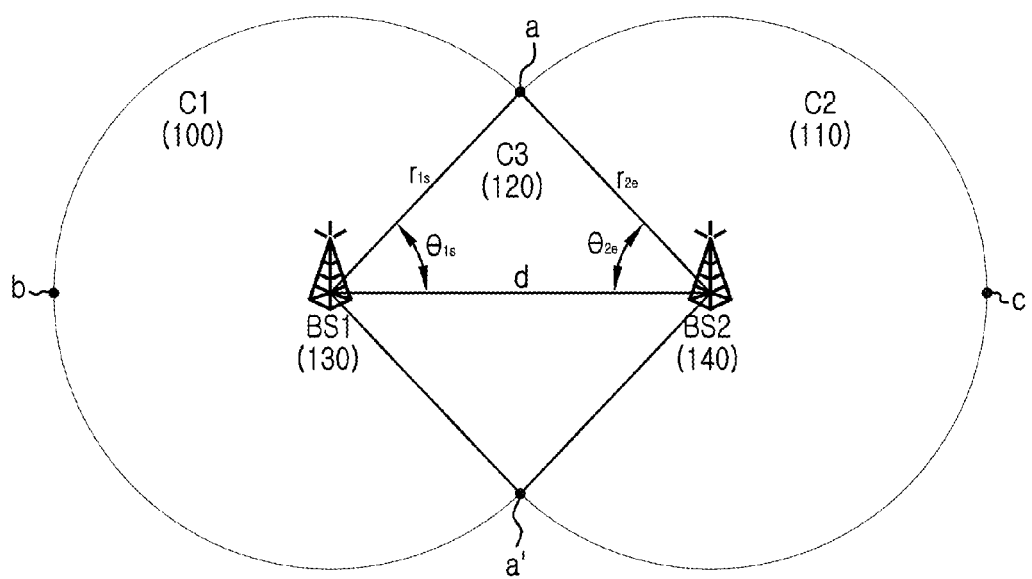
FIG. 1 is a diagram for analyzing the coverage of a mobile Base Station (BS) according to an exemplary embodiment of the present invention.

FIG. 1 is a diagram for analyzing the coverage of a mobile BS according to an exemplary embodiment of the present invention.

FIG. 1 assumes that cell regions of mobile BSs are shown by circles centering on the respective mobile BSs, and considers a model in which two mobile BSs (i.e., a BS1 130 and a BS2 140) transmit at any power and have certain coverage portions overlaid on each other, respectively.

Referring to FIG. 1, a cell region shown centering on the BS1 130 is overlaid on a cell region shown centering on the BS2 140.

In FIG. 1, the entire system coverage (C1 100+C2 110+C3 120) is given in Formula 1 below:

$$\text{Coverage} = C1 + C2 + C3 \quad (1)$$

$$= 2 \cdot \int_{\theta_{1s}}^{\pi} \int_{0}^{r_1} r \, dr \, d\theta + 2 \cdot \int_{0}^{\theta_{2e}} \int_{0}^{r_2} r \, dr \, d\theta + C3$$

In Formula 1, the 'C1' 100 is a remaining region excepting a region overlaid on a cell region of the BS2 140 in a cell region of the BS1 130, the 'C2' 110 is a remaining region excepting a region overlaid on the cell region of the BS1 130 in the cell region of the BS2 140, and the 'C3' 120 is a superposition region between the cell region of the BS1 130 and the cell region of the BS2 140. The '$\theta_{1s}$' is an angle between a line between the BS1 130 and the 'a' point and a line between the BS1 130 and the BS2 140. The '$r_1$' is a radius of the cell region of the BS1 130. The '$\theta_{2e}$' is an angle between a line between the BS2 140 and the 'a' point and the line between the BS1 130 and the BS2 140. The '$r_2$' is a radius of the cell region of the BS2 140.

At the 'a' point, receive power from the two BSs (BS1 and BS2) are the same as each other, and the 'a' point exists at a boundary of the two cells. Accordingly, Formulas 2, 3, and 4 below are given.

$$\frac{C}{I+N} = \frac{\frac{TxP_1 \cdot SF_1}{B \cdot r_{1s}^A}}{\frac{TxP_2 \cdot SF_2}{B \cdot r_{2e}^A} + N} = \frac{\frac{P_1}{B \cdot r_{1s}^A}}{\frac{P_2}{B \cdot r_{2e}^A} + N} = CINR_{coverage} \quad (2)$$

$$\frac{P_1}{B \cdot r_{1s}^A} = \frac{P_2}{B \cdot r_{2e}^A} \quad (3)$$

$$r_{2e}^2 = r_{1s}^2 + d^2 - 2 \cdot d \cdot r_{1s} \cdot \cos\theta_{1s} \quad (4)$$

Here, the $$\frac{C}{I+N},$$

represents a Carrier to Interference and Noise Ratio (CINR) value, the '$CINR_{coverage}$' is a CINR at a cell edge, the '$r_{1s}$' is a distance between the BS1 and the 'a' point in FIG. 1, the '$r_{2e}$' is a distance between the BS2 and the 'a' point in FIG. 1, the '$TxP_1$' is the transmit power of the BS1, the '$TxP_2$' is the transmit power of the BS2, the '$SF_1$' is a Shadowing Factor of the BS1, the '$SF_2$' is a Shadowing Factor of the BS2, the 'N' is thermal noise power, the '$P_1$' is $TxP_1 \cdot SF_1$, and the '$P_2$' is $TxP_2 \cdot SF_2$. The 'd' is a distance between the BS1 and the BS2. And, the 'A' and 'B' are pathloss related parameters, and are described in more detail in FIG. 6 below.

The '$r_{1s}$', '$\theta_{1s}$', '$r_{2e}$', and '$\theta_{2e}$' can be determined by Formulas 2, 3, and 4 above. The '$r_{1s}$', '$\theta_{1s}$', '$r_{2e}$', and '$\theta_{2e}$' values are given as in Formulas 5 to 8 below:

$$r_{1s} = \left(\frac{P_1 - CINR_{coverage} \cdot P_1}{CINR_{coverage} \cdot N \cdot B}\right)^{\frac{1}{A}} \tag{5}$$

$$\theta_{1s} = \tag{6}$$
$$\arccos\left(\frac{\left(\frac{P_1 - CINR_{coverage} \cdot P_1}{CINR_{coverage} \cdot N \cdot B}\right)^{\frac{2}{A}} + d^2 - \left(\frac{P_2 - CINR_{coverage} \cdot P_2}{CINR_{coverage} \cdot N \cdot B}\right)^{\frac{2}{A}}}{2 \cdot d \cdot \left(\frac{P_1 - CINR_{coverage} \cdot P_1}{CINR_{coverage} \cdot N \cdot B}\right)^{\frac{1}{A}}}\right)$$

$$r_{2e} = \left(\frac{P_2 - CINR_{coverage} \cdot P_2}{CINR_{coverage} \cdot N \cdot B}\right)^{\frac{1}{A}} \tag{7}$$

$$\theta_{2e} = \pi - \tag{8}$$
$$\arccos\left(\frac{\left(\frac{P_2 - CINR_{coverage} \cdot P_2}{CINR_{coverage} \cdot N \cdot B}\right)^{\frac{2}{A}} + d^2 - \left(\frac{P_1 - CINR_{coverage} \cdot P_1}{CINR_{coverage} \cdot N \cdot B}\right)^{\frac{2}{A}}}{2 \cdot d \cdot \left(\frac{P_2 - CINR_{coverage} \cdot P_2}{CINR_{coverage} \cdot N \cdot B}\right)^{\frac{1}{A}}}\right)$$

Here, the areas of the C1, C2, and C3 regions of FIG. 1 can be determined by Formulas 5 to 8 above.

First, the area of the C3 region can be expressed in Formula 9 below:

$$C3 = d \cdot r_{1s} \cdot \sin\theta_{1s} \tag{9}$$

$$= d \cdot \left(\frac{P_1 - CINR_{coverage} \cdot P_1}{CINR_{coverage} \cdot N \cdot B}\right)^{\frac{1}{A}} \cdot$$
$$\sin\left(\arccos\left(\frac{\left(\frac{P_1 - CINR_{coverage} \cdot P_1}{CINR_{coverage} \cdot N \cdot B}\right)^{\frac{2}{A}} + d^2 - \left(\frac{P_2 - CINR_{coverage} \cdot P_2}{CINR_{coverage} \cdot N \cdot B}\right)^{\frac{2}{A}}}{2 \cdot d \cdot \left(\frac{P_1 - CINR_{coverage} \cdot P_1}{CINR_{coverage} \cdot N \cdot B}\right)^{\frac{1}{A}}}\right)\right)$$

Figure 2:
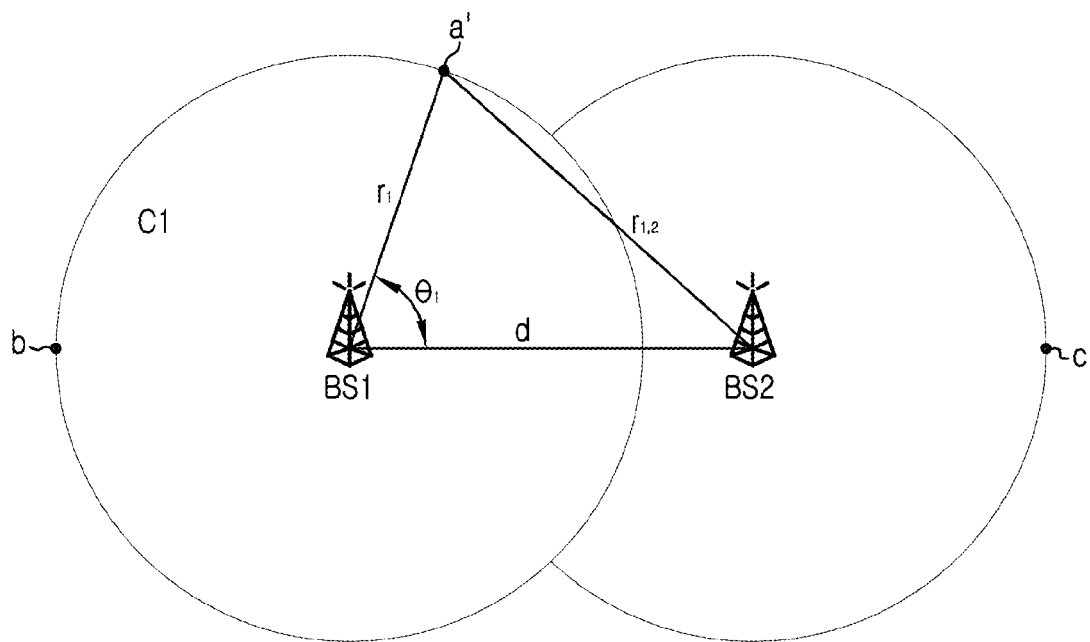
FIG. 2 is a diagram illustrating an example of coverage superposition for obtaining a C1 area according to an exemplary embodiment of the present invention.

FIG. 2 is a diagram illustrating an example of coverage superposition for obtaining a C1 area according to an exemplary embodiment of the present invention.

Referring to FIG. 2, the '$r_1$' is a distance between a BS1 and the 'a'' point (or is a radius of a cell region of the BS1), the 'd' is a distance between the BS1 and a BS2, the '$r_{1,2}$' is a distance between the BS2 and the 'a'' point, and the '$\theta_1$' is an angle between the '$r_1$' and the 'd'. The 'a'' point is located at a cell edge of the BS1.

Here, the area of the C1 region can be derived from Formulas 10 and 11 below:

$$r_{1,2}^2 = r_1^2 + d^2 - 2 \cdot d \cdot r_1 \cdot \cos\theta_1 \tag{10}$$

$$\frac{\frac{p_1}{B \cdot r_1^A}}{\frac{p_2}{B \cdot r_{1,2}^A} + N} = CINR_{coverage} \tag{11}$$

In FIG. 2, the C1 area can be obtained based on three cases divided according to the relationship between noise power and interference power at the 'b' point:

The first case is when noise power is greater than interference power at the 'b' point that is at an edge of coverage of the BS1.

The second case is when noise power is similar to interference power.

The third case is when noise power is less than interference power.

1) C1 Area when Noise Power>>Interference Power at the 'b' Point

First, when noise power at the 'b' point is much larger than interference power from the BS2, the interference power can be disregarded. Hence, to obtain the C1 area in FIG. 2, conditional formulas such as Formulas 12 and 13 below can be defined by Formula 11 above.

$$r_{1b} = \left(\frac{P_1}{CINR_{coverage} \cdot N \cdot B}\right)^{\frac{1}{A}} \tag{12}$$

$$(P_1)^{\frac{1}{A}} \gg \left((CINR_{coverage} \cdot P_2)^{\frac{1}{A}} - d \cdot (N \cdot B \cdot CINR_{coverage})^{\frac{1}{A}}\right) \tag{13}$$
at $r_{1b}$ Here, assuming that a distance ($r_1$) of Formula 12 above equals the '$r_{1b}$' within the C1 region, Formula 14 below can be obtained by Formulas 6 and 12 above.

$$C1 = 2\int_{\theta_1}^{\pi}\int_0^{r_1} r\,dr\,d\theta = \left(\frac{P_1}{CINR_{coverage} \cdot N \cdot B}\right)^{\frac{2}{A}} \cdot \tag{14}$$

$$\left(\pi - \arccos\left(\frac{\left(\frac{P_1 - CINR_{coverage} \cdot P_1}{CINR_{coverage} \cdot N \cdot B}\right)^{\frac{2}{A}} + d^2 - \left(\frac{P_2 - CINR_{coverage} \cdot P_2}{CINR_{coverage} \cdot N \cdot B}\right)^{\frac{2}{A}}}{2 \cdot d \cdot \left(\frac{P_1 - CINR_{coverage} \cdot P_1}{CINR_{coverage} \cdot N \cdot B}\right)^{\frac{1}{A}}}\right)\right)$$

2) C1 Area when Noise Power≈Interference Power at the 'b' Point

When noise power is similar to interference power at the 'b' point, Formula 11 above equals Formula 15 below, and Formula 10 above can be expressed by Formula 16 below:

$$r_{1b,2}^A = \frac{2 \cdot CINR_{coverage} \cdot p_2 \cdot r_{1b}^A}{p_1} \tag{15}$$

$$r_{1b,2} = r_{1b}^2 + d^2 - 2 \cdot d \cdot r_{1b} \cdot \cos\theta_1 \tag{16}$$

Here, Formulas 15 and 16 above should meet Formulas 17 and 18 below. In other words, Formulas 15 and 16 above are not derived until meeting Formula 17 and 18 below.

$$P_1 < 2 \cdot CINR_{coverage} \cdot P_2 \tag{17}$$

$$(P_1)^{\frac{1}{A}} \cong (2 \cdot CINR_{coverage} \cdot P_2)^{\frac{1}{A}} - d \cdot (2 \cdot N \cdot B \cdot CINR_{coverage})^{\frac{1}{A}} \text{ at } r_{1b} \tag{18}$$

Formula 19 below for the '$r_{1b}$' is derived by Formulas 15 and 16 above.

$$r_{1b} = \frac{d \cdot \left(\cos\theta_1 - \sqrt{\cos^2\theta_1 - 1 + \left(\frac{2 \cdot CINR_{coverage} P_2}{P_1}\right)^{\frac{2}{A}}}\right)}{1 - \left(\frac{2 \cdot CINR_{coverage} \cdot P_2}{P_1}\right)^{\frac{2}{A}}} \quad (19)$$

Here, the C1 area is determined by Formula 20 below using Formulas 6 and 19 above.

$$C1 = 2\int_{\theta_{1s}}^{\pi}\int_0^{r_1} r\,dr\,d\theta = \frac{d^2}{\left(1 - \left(\frac{2 \cdot CINR_{coverage} \cdot P_2}{P_1}\right)^{\frac{2}{A}}\right)^2} \quad (20)$$

$$\int_{\arccos}^{\pi}\left(\frac{\left(\frac{P_1 - CINR_{coverage} \cdot P_1}{CINR_{coverage} \cdot N \cdot B}\right)^{\frac{2}{A}} + d^2 - \left(\frac{P_2 - CINR_{coverage} \cdot P_2}{CINR_{coverage} \cdot N \cdot B}\right)^{\frac{2}{A}}}{2 \cdot d \cdot \left(\frac{P_1 - CINR_{coverage} \cdot P_1}{CINR_{coverage} \cdot N \cdot B}\right)^{\frac{1}{A}}}\right)$$

$$\left(\cos\theta_1 - \sqrt{\cos^2\theta_1 - 1 + \left(\frac{2 \cdot CINR_{coverage} \cdot P_2}{P_1}\right)^{\frac{2}{A}}}\right)^2 d\theta$$

3) C1 Area when Noise Power<<Interference Power at the 'b' Point

When noise power is much less than interference power at the 'b' point, Formula 11 above can be expressed by Formula 21 below:

$$r_{1b,2}^A = \frac{CINR_{coverage} \cdot p_2 \cdot r_{1b}^A}{p_1} \quad (21)$$

Formula 22 below for the 'r1b' is derived by Formulas 10 and 21 above.

$$r_{1b} = \frac{d \cdot \left(\cos\theta_1 - \sqrt{\cos^2\theta_1 - 1 + \left(\frac{CINR_{coverage} P_2}{P_1}\right)^{\frac{2}{A}}}\right)}{1 - \left(\frac{CINR_{coverage} \cdot P_2}{P_1}\right)^{\frac{2}{A}}} \quad (22)$$

Here, Formula 22 above should meet Formulas 23 and 24 below. In other words, Formula 22 above is not derived until meeting Formulas 23 and 24 below.

$$P_1 < CINR_{coverage} \cdot P_2 \quad (23)$$

$$(P_1)^{\frac{1}{A}} \ll \left((CINR_{coverage} \cdot P_2)^{\frac{1}{A}} - d \cdot (N \cdot B \cdot CINR_{coverage})^{\frac{1}{A}}\right) \quad (24)$$
at $r_{1b}$ The C1 area is determined by Formula 25 below using Formulas 6 and 21 above.

$$C1 = 2\int_{\theta_{1s}}^{\pi}\int_0^{r_1} r\,dr\,d\theta = \frac{d^2}{\left(1 - \left(\frac{CINR_{coverage} \cdot P_2}{P_1}\right)^{\frac{2}{A}}\right)^2} \quad (25)$$

-continued $$\int_{\arccos}^{\pi}\left(\frac{\left(\frac{P_1 - CINR_{coverage} \cdot P_1}{CINR_{coverage} \cdot N \cdot B}\right)^{\frac{2}{A}} + d^2 - \left(\frac{P_2 - CINR_{coverage} \cdot P_2}{CINR_{coverage} \cdot N \cdot B}\right)^{\frac{2}{A}}}{2 \cdot d \cdot \left(\frac{P_1 - CINR_{coverage} \cdot P_1}{CINR_{coverage} \cdot N \cdot B}\right)^{\frac{1}{A}}}\right)$$

$$\left(\cos\theta_1 - \sqrt{\cos^2\theta_1 - 1 + \left(\frac{CINR_{coverage} P_2}{P_1}\right)^{\frac{2}{A}}}\right)^2 d\theta$$

Finally, the area of the C2 region can be derived in a method similar to the C1 area determination method.

Figure 3:
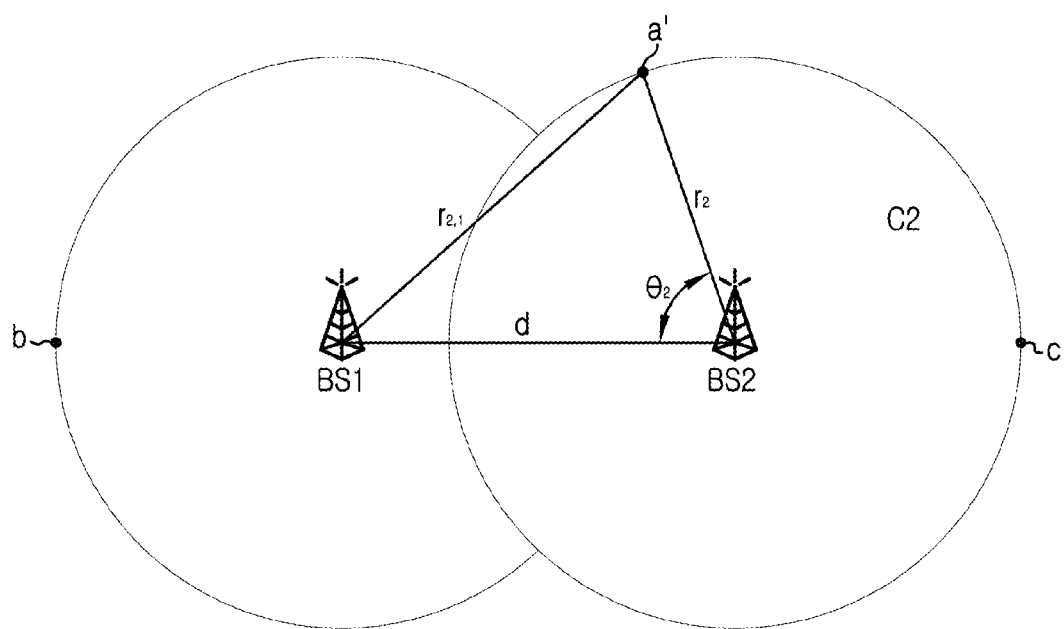
FIG. 3 is a diagram illustrating an example of coverage superposition for obtaining a C2 area according to an exemplary embodiment of the present invention.

FIG. 3 is a diagram illustrating an example of coverage superposition for obtaining a C2 area according to an exemplary embodiment of the present invention.

Referring to FIG. 3, the '$r_2$' is a distance between a BS2 and the 'a" point (or is a radius of a cell region of the BS2), the 'd' is a distance between a BS1 and the BS2, the '$r_{2,1}$' is a distance between the BS1 and the 'a" point, and the '$\theta_2$' is an angle between the '$r_2$' and the 'd'. The 'a" point is located at a cell edge of the BS2.

A method for obtaining the C2 area is given as follows.
1) C2 Area when Noise Power>>Interference Power at the 'c' Point Referring to FIG. 3, to obtain the C2 area in the same method as that of the C1 area, a conditional formula such as Formula 26 below is derived assuming that noise power is larger than interference power at the 'c' point of the BS2. The C2 area is given in Formula 27 below:

$$(P_2)^{\frac{1}{A}} \gg \left((CINR_{coverage} \cdot P_1)^{\frac{1}{A}} - d \cdot (N \cdot B \cdot CINR_{coverage})^{\frac{1}{A}}\right) \text{ at } r_{2c} \quad (26)$$

$$C2 = 2\int_0^{\theta_{2e}}\int_0^{r_2} r\,dr\,d\theta = \left(\frac{P_2}{CINR_{coverage} \cdot N \cdot B}\right)^{\frac{2}{A}}. \quad (27)$$

$$\pi - \arccos\left(\frac{\left(\frac{P_2 - CINR_{coverage} \cdot P_2}{CINR_{coverage} \cdot N \cdot B}\right)^{\frac{2}{A}} + d^2 - \left(\frac{P_1 - CINR_{coverage} \cdot P_1}{CINR_{coverage} \cdot N \cdot B}\right)^{\frac{2}{A}}}{2 \cdot d \cdot \left(\frac{P_2 - CINR_{coverage} \cdot P_2}{CINR_{coverage} \cdot N \cdot B}\right)^{\frac{1}{A}}}\right)$$

2) C2 Area when Noise Power≈Interference Power at the 'c' Point

In case that noise power is similar to interference power at the 'c' point, Formulas 28 and 29 below are derived. At this time, the C2 area is given in Formula 30 below:

$$P_2 < 2 \cdot CINR_{coverage} \cdot P_1 \quad (28)$$

$$(P_2)^{\frac{1}{A}} \cong \left((2 \cdot CINR_{coverage} \cdot P_1)^{\frac{1}{A}} - d \cdot (2 \cdot N \cdot B \cdot CINR_{coverage})^{\frac{1}{A}}\right) \text{ at } r_{2c} \quad (29)$$

$$C2 = 2\int_0^{\theta_{2e}}\int_0^{r_2} r\,dr\,d\theta = \frac{d^2}{\left(1 - \left(\frac{2 \cdot CINR_{coverage} \cdot P_1}{P_2}\right)^{\frac{2}{A}}\right)^2} \quad (30)$$

$$\int_0^{\pi - \arccos}\left(\frac{\left(\frac{P_2 - CINR_{coverage} \cdot P_2}{CINR_{coverage} \cdot N \cdot B}\right)^{\frac{2}{A}} + d^2 - \left(\frac{P_1 - CINR_{coverage} \cdot P_1}{CINR_{coverage} \cdot N \cdot B}\right)^{\frac{2}{A}}}{2 \cdot d \cdot \left(\frac{P_2 - CINR_{coverage} \cdot P_2}{CINR_{coverage} \cdot N \cdot B}\right)^{\frac{1}{A}}}\right)$$

$$\left(\cos\theta_2 + \sqrt{\cos^2\theta_2 - 1 + \left(\frac{2 \cdot CINR_{coverage} \cdot P_1}{P_2}\right)^{\frac{2}{A}}}\right)^2 d\theta$$

3) C2 Area when Noise Power<<Interference Power at the 'c' Point

Finally, when noise power is much less than interference power at the 'c' point, Formulas 31 and 32 below are given. And, at this time, the C2 area is given in Formula 33 below:

$$P_2 < CINR_{coverage} \cdot P_1 \quad (31)$$

$$(P_2)^{\frac{1}{A}} \ll \left((CINR_{coverage} \cdot P_1)^{\frac{1}{A}} - d \cdot (N \cdot B \cdot CINR_{coverage})^{\frac{1}{A}}\right) \text{ at } r_{2c} \quad (32)$$

$$C2 = 2 \int_0^{\theta_{2e}} \int_0^{r_2} r \, dr \, d\theta = \frac{d^2}{\left(1 - \left(\frac{CINR_{coverage} \cdot P_1}{P_2}\right)^{\frac{2}{A}}\right)^2} \quad (33)$$

$$\int_0^{\pi - \arccos\left(\frac{\left(\frac{P_2 - CINR_{coverage} \cdot P_2}{CINR_{coverage} \cdot N \cdot B}\right)^{\frac{2}{A}} + d^2 - \left(\frac{P_1 - CINR_{coverage} \cdot P_1}{CINR_{coverage} \cdot N \cdot B}\right)^{\frac{2}{A}}}{2 \cdot d \cdot \left(\frac{P_2 - CINR_{coverage} \cdot P_2}{CINR_{coverage} \cdot N \cdot B}\right)^{\frac{1}{A}}}\right)}$$

$$\left(\cos\theta_2 + \sqrt{\cos^2\theta_2 - 1 + \left(\frac{CINR_{coverage} \cdot P_1}{P_2}\right)^{\frac{2}{A}}}\right)^2 d\theta$$

On the other hand, to maximize coverage, if analyzing a propagation environment with two mobile BSs, five propagation environments can be considered as in Formula 34 below.

|   | BS1 | BS2 | (34) |
|---|---|---|---|
| a. | Noise Power ≫ Interference Power | Noise Power ≫ Interference Power | |
| b. | Noise Power ≫ Interference Power | Noise Power ≅ Interference Power | |
| c. | Noise Power ≫ Interference Power | Noise Power ≪ Interference Power | |
| d. | Noise Power ≅ Interference Power | Noise Power ≅ Interference Power | |
| e. | Noise Power ≅ Interference Power | Noise Power ≪ Interference Power | |

Noise Power<<Interference Power (BS1) and Noise Power<<Interference Power (BS2) does not exist, because Formulas 23 and 31 above cannot be simultaneously met. On the other hand, assuming that '$CINR_{coverage}$' is equal to −3.5 dB that is the minimum required CINR in a Pedestrian A 3 km/h Single Input Multi Output (SIMO), Quadrature Phase Shift Keying (QPSK) 1/12 environment, Noise Power≈Interference Power (BS1) and Noise Power ≈Interference Power (BS2) does not exist, because Formulas 17, 18, 28, and 29 above cannot be simultaneously met in case that the BS1 and the BS2 all transmit at the maximum transmit power. Also, even Noise Power ≈Interference Power (BS1) and Noise Power<<Interference Power (BS2) does not exist, because Formulas 17, 18, 31, and 32 above cannot be simultaneously met. Hence, actually, in Formula 34 above, only the three propagation environments (a, b, and c) exist.

Figure 4:
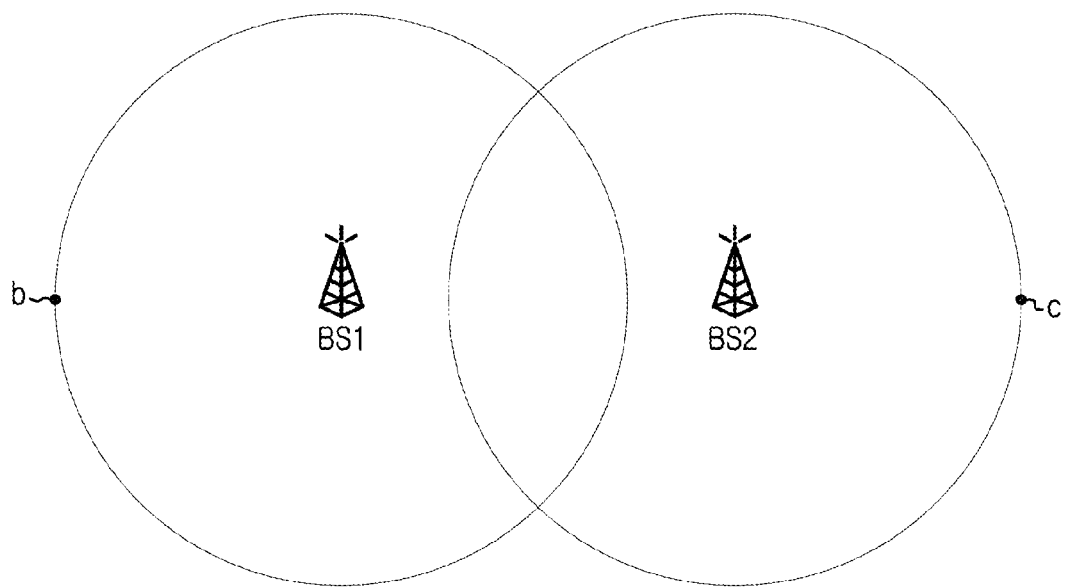
FIG. 4 is a diagram illustrating an example of cell superposition in case of noise power>>interference power (BS1) and noise power>>interference power (BS2) according to an exemplary embodiment of the present invention.

FIG. 4 is a diagram illustrating an example of cell superposition in case of Noise Power>>Interference Power (BS1) and Noise Power>>Interference Power (BS2) according to an exemplary embodiment of the present invention.

Referring to FIG. 4, from a BS1 standpoint, at the 'b' point, the BS1 does not receive an interference signal from a BS2 and hence, noise power is much larger than interference power. Similarly, from the BS2 standpoint, at the 'c' point, the BS2 does not receive an interference signal from the BS1 and hence, noise power is much larger than interference power.

Figure 5:
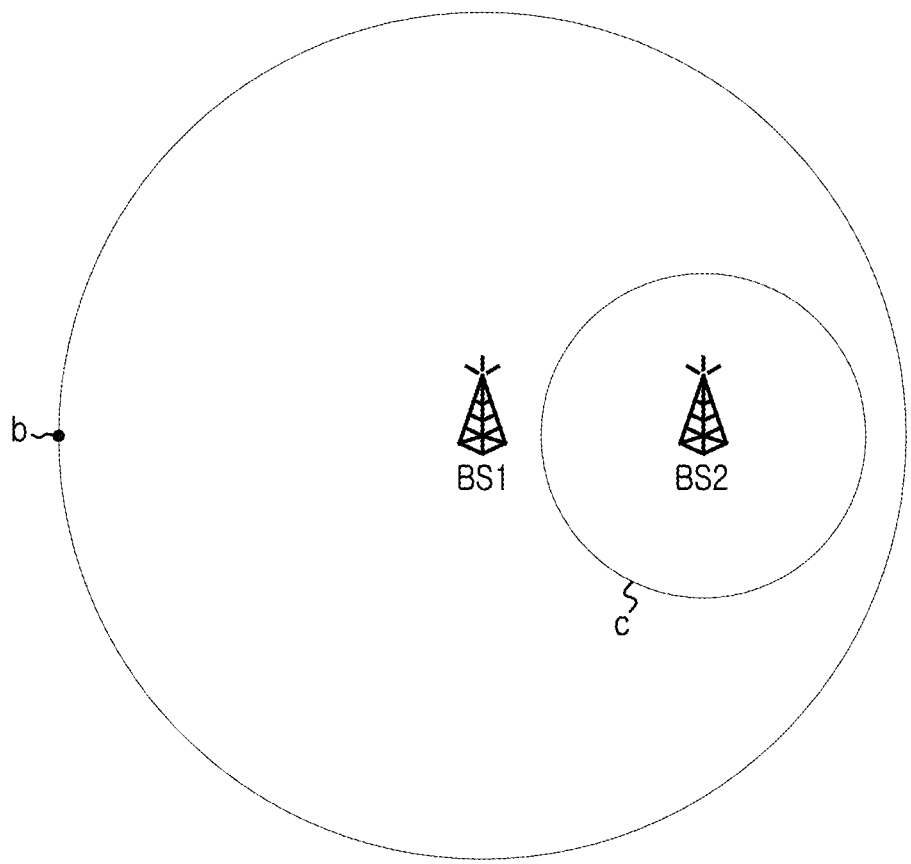
FIG. 5 is a diagram illustrating an example of cell superposition in case of noise power>>interference power (BS1) and noise power<<interference power (BS2) according to an exemplary embodiment of the present invention.

FIG. 5 is a diagram illustrating an example of cell superposition in case of Noise Power>>Interference Power (BS1) and Noise Power<<Interference Power (BS2) at the 'c' point according to an exemplary embodiment of the present invention.

Referring to FIG. 5, in case that a cell region of a BS1 includes a cell region of a BS2, at the 'b' point, noise power is much larger than interference power because the BS1 does not receive an interference signal from the BS2 and, at the 'c' point, interference power is much larger than noise power because the BS2 receives an interference signal from the BS1.

Here, assuming that two BSs have substantially the same maximum transmit power in FIGS. 4 and 5, the BSs of FIG. 4 have wider coverage than those of FIG. 5. That is, in FIG. 4, there is no interference when excluding an overlapped portion of two circles, while, in FIG. 5, there is interference in the BS1 within a cell region of the BS2 and also there is interference of the BS2 in many portions of a cell region of the BS1. Hence, minimizing the transmit power of the BS2 in FIG. 5 leads to maximizing the entire system coverage.

An exemplary method of determining a wireless propagation environment of FIG. 5 is minimizing the transmit power of a BS not meeting the condition of Noise Power>>Interference Power as mentioned above. On the contrary, maximizing the transmit power of a BS meeting the condition of Noise Power>>Interference Power makes the maximization of the entire coverage possible.

In case of meeting 'N>2·Interference' at cell end points, i.e., the 'b' point and the 'c' point, it is determined to meet the condition of Noise Power>>Interference Power. From 'dB' standpoint, it meets 'Noise (dB)−3>Interference (dB)'.

Accordingly, coverage is maximized when minimizing the transmit power of a mobile BS not meeting the condition of Noise Power>>Interference Power among two mobile BSs. Formula 35 below regarding the condition of Noise Power>>Interference Power is obtained.

if, N>2·Interference, (Noise power>>Interference power) (35)

Accordingly, Formula 36 below is derived by Formulas 13 and 35 above, and the coverage of a corresponding BS is maximized if setting the transmit power of the corresponding BS to the maximum when meeting Formula 36 below.

$$N(dB) - TxP_j(dB) - SF_j(dB) + B(dB) + \quad (36)$$

$$10 \cdot A \cdot \log\left(\left(\frac{MaxTxP_i \cdot SF_i}{CINR_{coverage} \cdot N \cdot B}\right)^{\frac{1}{A}} + d\right) - 3 \geq 0$$

In Formula 36 above, the 'i' is a BS index of setting transmit power, the 'j' is a neighbor BS index, the 'N' is thermal noise power, the 'SF' is a Shadowing Factor, the 'd' is a distance between BSs, the 'A' is a pathloss exponent, the 'B' is pathloss compensation constant, and the 'MaxTxP' is the maximum transmit power.

Formula 36 above is expressed by Formula 37 below using a receive power value ($RxP_{ji}$) from a $j^{th}$ BS to an $i^{th}$ BS.

$$10 \cdot A \cdot \log\left(1 + \left(\frac{MaxTxP_i \cdot SF_i}{CINR_{coverage} \cdot N \cdot B}\right)^{\frac{1}{A}} \bigg/ d\right) + \tag{37}$$

$$SF_i(dB) + N(dB) - RxP_{ji}(dB) - 3 \geq 0$$

Shadowing estimation is described below. In Formula 37 above, the '$CINR_{coverage}$', 'N', 'MaxTxP', etc. are parameters determined in a system, and the 'A', 'B', 'SF', etc. are parameters needing to be estimated in a BS and parameters needing to be measured such as receive power. In case of determining all parameters and meeting Formula 37 above, the maximum coverage can be obtained by setting the transmit power of a corresponding BS to the maximum value.

To estimate a shadowing value of a BS needing to determine transmit power, receive power from a different BS is measured. At the measured receive power, a BS index is determined in Formula 38 below:

$$BSIndex = \underset{\substack{j \\ j \neq i}}{\arg\min}(RxP_{ji}(dBm)), \tag{38}$$

$$\{j \mid CINR_{ji}(dB) \geq CINR_{OTARSensitivity}\}$$

A BS setting transmit power measures receive power from determined neighbor BSs and determines an average value. These values are used to determine a shadowing parameter in Formula 39 below.

$$SF_i(dB) = \tag{39}$$

$$\frac{(RxP_{BSindex,i}(dB) - E[RxP_{BSindex,m}(dB)])}{\alpha} + \left(1 - \frac{1}{\alpha}\right) \cdot SF_i(dB)$$

Pathloss parameter estimation is described below. To obtain inter-BS pathloss related parameters (i.e., 'A' and 'B' values of Formula 37 above), a Least Mean Square (LMS) method is used. In the LMS method, the 'A' and 'B' values can be determined in Formulas 40 and 41 below:

$$A = \frac{\left(N_{BS} \sum_{\substack{j=1 \\ j \neq i}}^{N_{BS}} \log(d_{ji}) \cdot PL_{ji}(dB) - \sum_{\substack{j=1 \\ j \neq i}}^{N_{BS}} \log(d_{ji}) \sum_{\substack{j=1 \\ j \neq i}}^{N_{BS}} PL_{ji}(dB)\right)}{10\left(N_{BS} \sum_{\substack{j=1 \\ j \neq i}}^{N_{BS}} (\log(d_{ji}))^2 - \left(\sum_{\substack{j=1 \\ j \neq i}}^{N_{BS}} \log(d_{ji})\right)^2\right)} \tag{40}$$

$$B = 10^{\frac{\left(\sum_{\substack{j=1 \\ j \neq i}}^{N_{RAS}} (\log(d_{ji}))^2 \sum_{\substack{j=1 \\ j \neq i}}^{N_{RAS}} PL_{ji}(dB) - \sum_{\substack{j=1 \\ j \neq i}}^{N_{RAS}} \log(d_{ji}) \sum_{\substack{j=1 \\ j \neq i}}^{N_{RAS}} \log(d_{ji}) \cdot PL_{ji}(dB)\right)}{10\left(N_{RAS} \sum_{\substack{j=1 \\ j \neq i}}^{N_{RAS}} (\log(d_{ji}))^2 - \left(\sum_{\substack{j=1 \\ j \neq i}}^{N_{RAS}} \log(d_{ji})\right)^2\right)}} \tag{41}$$

On the other hand, a spaced distance (d) between BSs is estimated in Formula 42 above using a frame synchronization value at the time of measuring a Received Signal Strength Indication (RSSI) of a neighbor BS.

$$d = \text{sync} \cdot (3 \times 10^8)/\text{SamplingRate} \tag{42}$$

As described above, substitution into Formula 37 above determines the transmit power of a corresponding mobile BS. The transmit power determination can be divided into initial transmit power determination (Formula 43 below) and working transmit power determination (Formula 44 below).

$$\underset{\substack{j \\ j \neq i}}{\min}\left(10 \cdot A \cdot \log\left(1 + \left(\frac{MaxTxP_i}{CINR_{coverage} \cdot N \cdot B}\right)^{\frac{1}{A}} \bigg/ d\right) + \tag{43}$$

$$N(dB) - RxP_{ji}(dB) - 3\right) \geq 0,$$

$$\{j \mid CINR_{ji} \geq CINR_{Threshold}, UsedFA_j = UsedFA_i\}$$

$$\underset{\substack{j \\ j \neq i}}{\min}\left(10 \cdot A \cdot \log\left(1 + \left(\frac{MaxTxP_i}{CINR_{coverage} \cdot N \cdot B}\right)^{\frac{1}{A}} \bigg/ d\right) + \tag{44}$$

$$SF_i(dB) + N(dB) - RxP_{ji}(dB) - 3\right) \geq 0,$$

$$\{j \mid CINR_{ji} \geq CINR_{Threshold}, UsedFA_j = UsedFA_i\}$$

Figure 6:
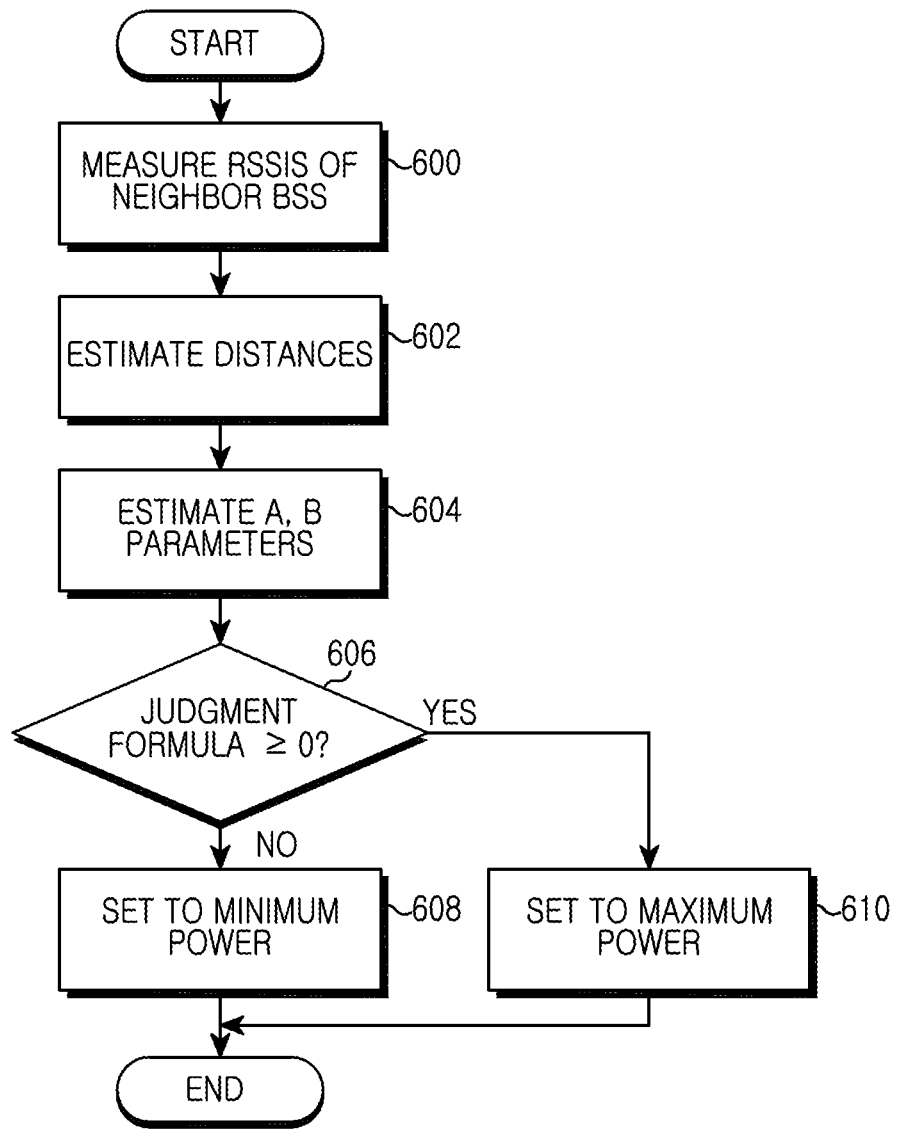
FIG. 6 is a flow diagram illustrating a procedure for controlling the initial transmit power of a mobile BS in a wireless communication system according to an exemplary embodiment of the present invention.

FIG. 6 is a flow diagram illustrating a procedure for controlling the initial transmit power of a mobile BS in a wireless communication system according to an exemplary embodiment of the present invention.

Referring to FIG. 6, in step 600, if a power source is supplied, the mobile BS measures RSSIs from neighbor BSs.

In step 602, in case that the mobile BS is connected with a backhaul, the mobile BS receives distance information with the neighbor BSs using Global Positioning System (GPS) information. In case that the mobile BS is not connected with the backhaul, the mobile BS estimates distances with the neighbor BSs using a different method such as Over-The-Air-Rekeying (OTAR) and the like.

In step 604, the mobile BS estimates the 'A' and 'B' parameters in an LMS method, using the measured RSSI value and distance value. The 'A' and 'B' parameters by the LMS method are determined by Formulas 40 and 41 above.

In step 606, the mobile BS substitutes the estimated values and given system parameters ('CINR', 'N', 'MaxTxP', etc.) into Formula 43 above. If the resultant value is greater than or equal to '0', the mobile BS proceeds to step 610 and sets initial transmit power to the maximum power.

On the other hand, if the resultant value is less than '0', the mobile BS proceeds to step 608 and sets the initial transmit power to the minimum power.

After that, the mobile BS terminates the transmit power control procedure.

Figure 7:
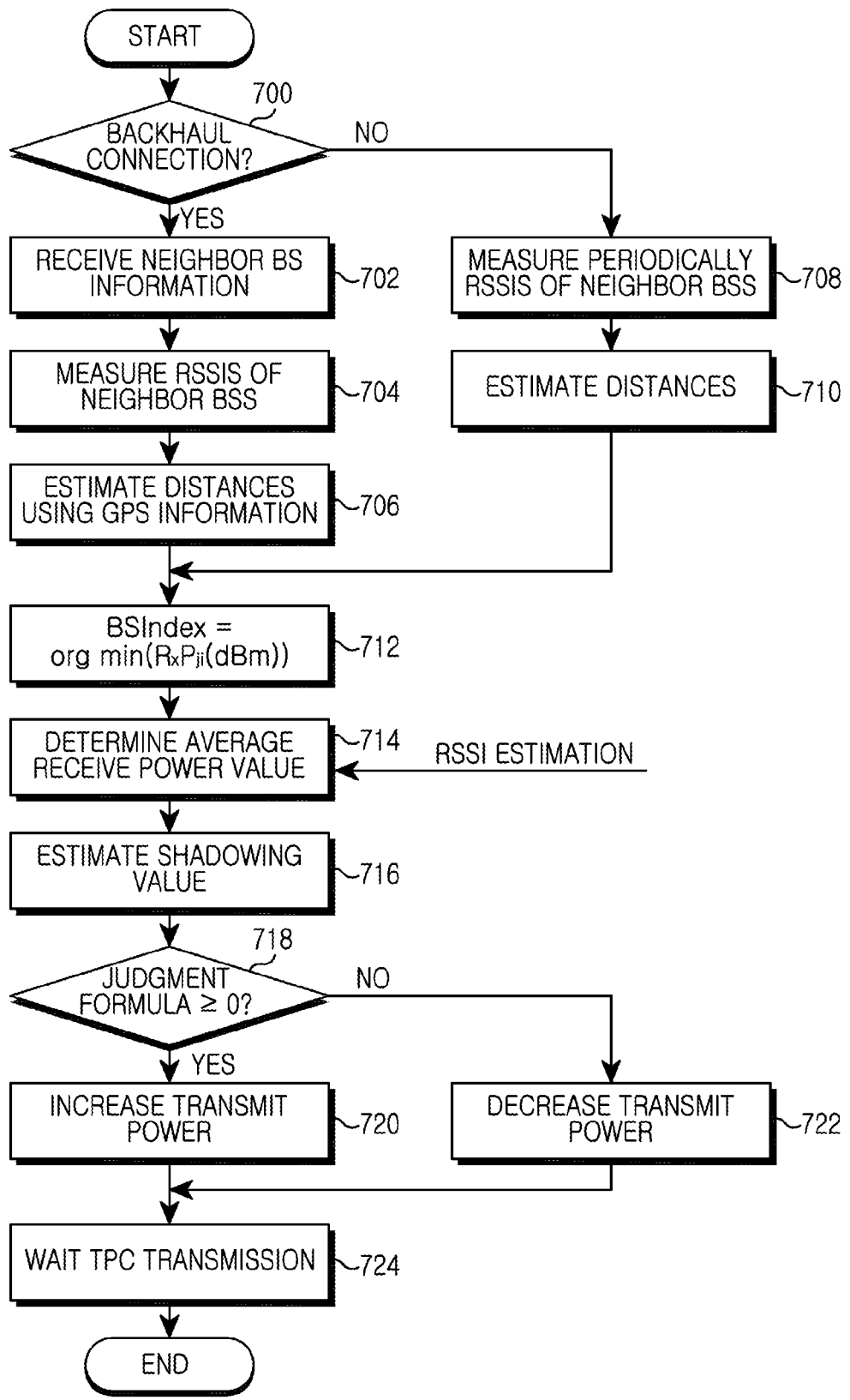
FIG. 7 is a flow diagram illustrating a procedure for controlling the working transmit power of a mobile BS in a wireless communication system according to an exemplary embodiment of the present invention.

FIG. 7 is a flow diagram illustrating a procedure for controlling the working transmit power of a mobile BS in a wireless communication system according to an exemplary embodiment of the present invention.

Referring to FIG. 7, in step 700, the mobile BS identifies if it is in connection with a backhaul network. If it is in connection with the backhaul network, in step 702 the mobile BS receives information on neighbor BSs from an upper network entity. In step 704, the mobile BS measures RSSIs for the neighbor BSs. In realization, in an initial transmit power control procedure, the mobile BS may measure an RSSI only for a neighbor BS of a change of transmit power.

In step 706, the mobile BS receives distance information with the neighbor BSs from the upper network entity with GPS information, because the backhaul network is in connection.

On the other hand, if it is determined in step 700 that the BS is not in connection with the backhaul network, the mobile BS periodically measures RSSIs for neighbor BSs in step 708 because the mobile BS cannot be aware of information on neighbor BSs regarding a change of transmit power. In step 710, the mobile BS estimates distances with the neighbor BSs using the measurement result.

In step 712, the mobile BS finds the minimum receive power value and searches a corresponding neighbor BS, based on the distances with the neighbor BSs and receive power values. In step 714, the mobile BS is reported for the minimum receive power values from the searched neighbor BSs by MSs being in connection, and obtains an average value.

In step 716, the mobile BS estimates a shadowing value for the minimum receive power values from the neighbor BSs and the receive power average values obtained from the MSs, using Formula 39 above, and substitutes previously acquired distance information and receive power value into Formula 40 and 41 above, and determines the 'A' and 'B' values.

In step 718, the mobile BS determines if transmit power increases or decreases by Formula 44 above.

If it is determined to increase transmit power, the mobile BS proceeds to step 720 and increases current transmit power by a predefined level. On the other hand, if it is determined to decrease transmit power, the mobile BS proceeds to step 722 and decreases current transmit power by a predefined level.

If the transmit power is controlled, in step 724 the mobile BS waits until a next Transmit Power Control (TPC) period.

Figure 8:
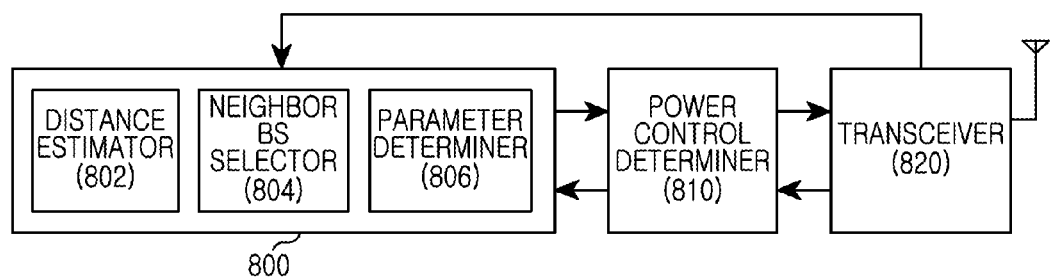
FIG. 8 is a block diagram illustrating an apparatus for controlling the transmit power of a mobile BS in a wireless communication system according to an exemplary embodiment of the present invention.

FIG. 8 is a block diagram illustrating an apparatus for controlling the transmit power of a mobile BS in a wireless communication system according to an exemplary embodiment of the present invention.

Referring to FIG. 8, the mobile BS includes an information provider 800, a power control determiner 810, and a transceiver 820.

The information provider 800 calculates parameters (e.g., shadowing estimation, pathloss estimation (A, B), etc.) for determining the condition of maximizing coverage dependent on a wireless propagation environment, and provides the calculated parameters to the power control determiner 810. The wireless propagation environment is determined depending on magnitudes of noise power and interference power. To determine the parameters for determining the condition of maximizing the coverage, the information provider 800 includes a distance estimator 802, a neighbor BS selector 804, and a parameter determiner 806.

The transceiver 820 communicates with a backhaul network through a predefined interface or communicates with MSs in a predefined communication scheme. For example, the transceiver 820 performs encoding/decoding and modulation/demodulation. Also, in case that it is in a connection state with the backhaul network, the transceiver 820 receives information on neighbor BSs from an upper network entity, and measures RSSIs for the neighbor BSs from a receive signal received from the transceiver 820, and provides the measured result to the distance estimator 802.

The distance estimator 802 receives distance information with the neighbor BSs from the upper network entity using GPS information, because the backhaul network is in connection. If it is not in connection with the backhaul network, the distance estimator 802 estimates distances with the neighbor BSs on the basis of periodically measured RSSIs of the neighbor BSs because it cannot be aware of information on neighbor BSs regarding a change of transmit power, and provides the estimated distances to the neighbor BS selector 804.

The neighbor BS selector 804 finds the minimum receive power value and searches a corresponding neighbor BS, based on the distances with the neighbor BSs and receive power values.

The parameter determiner 806 receives reports regarding the receive power values from the searched neighbor BS by MSs being in connection and obtains an average value. The parameter determiner 806 estimates a shadowing value for the minimum receive power values from the neighbor BSs and the receive power average values obtained from the MSs by Formula 39 above, and substitutes previously acquired distance information and receive power value into Formulas 40 and 41 above, and determines the 'A' and 'B' values.

The power control determiner 810 determines if transmit power increases or decreases by Formula 44 above on the basis of information provided from the information provider 800, and controls transmit power. For example, if it is determined to increase transmit power, the power control determiner 810 increases the current transmit power of the transceiver 820 by a predefined level and, if it is determined to decrease transmit power, the power control determiner 810 decreases the current transmit power of the transceiver 820 by a predefined level.

As described above, exemplary embodiments of the present invention can maximize the entire system coverage by determining the transmit power of a mobile BS for the maximum coverage in a wireless communication system. Also, exemplary embodiments of the present invention can reduce the influence of interference exerted on a system, minimize a decrease of coverage resulting from the interference, and provide a wireless communication service having excellent quality to users within the coverage of a mobile BS.

Also, because a mobile BS operates irrespective of a backhaul connection, no matter where the mobile BS is located, the mobile BS is operable while minimizing interference exerted on a legacy system. Exemplary embodiments of the present invention control transmit power adaptively even to a change of the coverage of an outdoor fixed BS or mobile BS, so exemplary embodiments of the present invention can adaptively control transmit power although a mobile BS or fixed BS is newly installed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling the transmit power of a mobile Base Station (BS) in a wireless communication system, the method comprising:
   estimating distances (d) with neighbor BSs;
   estimating a pathloss exponent (A) and a pathloss compensation constant (B) based on the distances (d) with neighbor BSs;
   determining a measurement value for determining whether a noise power level is higher than an interference power level based on the distances (d) with neighbor BSs, the pathloss exponent (A) and the pathloss compensation constant (B);
   when the measurement value is higher than a threshold value, determining that the noise power level is higher than the interference power level; and
   when it is determined that the noise power level is higher than the interference power level, increasing transmit power.

2. The method of claim 1, wherein the determining of the measurement value for determining whether the noise power level is higher than the interference power level comprises:

measuring Received Signal Strength Indications (RSSIs) of neighbor BSs; and estimating the pathloss exponent (A) and the pathloss compensation constant (B) based on the RSSIs of the neighbor BSs and the distances (d) with the neighbor BSs, in a Least Mean Square (LMS) method.

3. The method of claim 2, wherein at least one of the distances (d) with the neighbor BSs is determined based on a frame synchronization.

4. The method of claim 1, wherein the determining of the measurement value for determining whether the noise power level is higher than the interference power level comprises:

estimating Received Signal Strength Indications (RSSIs) from the neighbor BSs;

selecting a neighbor BS having the minimum receive power among the RSSIs of the neighbor BSs;

receiving at least one report from Mobile Stations (MSs) for receive power of the selected neighbor BS, and determining average receive power; and determining a Shadowing Factor (SF) based on the minimum receive power and the average receive power, and estimating the pathloss exponent (A) and the pathloss compensation constant (B) based on the RSSI of the selected neighbor BS and the distance (d) with the neighbor BS.

5. The method of claim 4, wherein the estimating of the distances (d) with the neighbor BSs comprises:

measuring the RSSIs of the neighbor BSs; and upon receiving the RSSIs of the neighbor BSs, estimating each of the distances (d) with the neighbor BSs based on a frame synchronization.

6. The method of claim 4, wherein the estimating of the distances (d) with the neighbor BSs comprises:

receiving neighbor BS information through a backhaul;

measuring an RSSI for a BS of a change of transmit power, based on the neighbor BS information; and receiving distance information with a neighbor BS based on Global Positioning System (GPS) information, through the backhaul.

7. The method of claim 4, wherein the SF is calculated using the following formula:

$$SF_i(dB) = \frac{(RxP_{BSindex,i}(dB) - E[RxP_{BSindex,m}(dB)])}{\alpha} + \left(1 - \frac{1}{\alpha}\right) \cdot SF_i(dB)$$

where E[x] denotes an average value, $RxP_{BSindex,i}$ denotes minimum receive power values from neighbor BSs, $RxP_{BSindex,m}$ denotes receive power values reported by MSs, $SF_{i-1}$ denotes a previous SF value, and $\alpha$ denotes a weighted value.

8. The method of claim 1, wherein the determining that the noise power level is higher than the interference power level is determined using the following formula:

$$\min_{\substack{j \\ j \neq i}} \left( 10 \cdot A \cdot \log\left(1 + \left(\frac{MaxTxP_i}{CINR_{coverage} \cdot N \cdot B}\right)^{\frac{1}{A}} \middle/ d\right) + N(dB) - RxP_{ji}(dB) - 3 \right) \geq 0,$$

$$\{j \mid CINR_{ji} \geq CINR_{Threshold}, UsedFA_j = UsedFA_i\}$$

where i denotes a BS index of setting transmit power, j denotes a neighbor BS index, N denotes a thermal noise power, d denotes a distance between BSs, A denotes the pathloss exponent, B denotes the pathloss compensation constant, MaxTxP denotes a maximum transmit power, and $RxP_{ji}$ denotes a receive power.

9. The method of claim 4, wherein the determining that the noise power level is higher than the interference power level is determined using the following formula:

$$\min_{\substack{j \\ j \neq i}} \left( 10 \cdot A \cdot \log\left(1 + \left(\frac{MaxTxP_i}{CINR_{coverage} \cdot N \cdot B}\right)^{\frac{1}{A}} \middle/ d\right) + SF_i(dB) + N(dB) - RxP_{ji}(dB) - 3 \right) \geq 0,$$

$$\{j \mid CINR_{ji} \geq CINR_{Threshold}, UsedFA_j = UsedFA_i\}$$

where i denotes a BS index of setting transmit power, j denotes a neighbor BS index, N denotes a thermal noise power, SF denotes a Shadowing Factor, d denotes a distance between BSs, A denotes the pathloss exponent, B denotes the pathloss compensation constant, MaxTxP denotes a maximum transmit power, and $RxP_{ji}$ denotes a receive power.

10. The method of claim 1, wherein the pathloss exponent (A) is defined using the following formula:

$$A = \frac{\left(N_{BS} \sum_{\substack{j=1 \\ j \neq i}}^{N_{BS}} \log(d_{ji}) \cdot PL_{ji}(dB) - \sum_{\substack{j=1 \\ j \neq i}}^{N_{BS}} \log(d_{ji}) \sum_{\substack{j=1 \\ j \neq i}}^{N_{BS}} PL_{ji}(dB)\right)}{10\left(N_{BS} \sum_{\substack{j=1 \\ j \neq i}}^{N_{BS}} (\log(d_{ji}))^2 - \left(\sum_{\substack{j=1 \\ j \neq i}}^{N_{BS}} \log(d_{ji})\right)^2\right)}$$

where $d_{ji}$ denotes a distance between j BS and i BS, and $PL_{ji}$ denotes a pathloss between j BS and i BS.

11. The method of claim 1, wherein the pathloss compensation constant (B) is defined using the following formula:

$$B = 10^{\frac{\left(\sum_{\substack{j=1 \\ j \neq i}}^{N_{RAS}} (\log(d_{ji}))^2 \sum_{\substack{j=1 \\ j \neq i}}^{N_{RAS}} PL_{ji}(dB) - \sum_{\substack{j=1 \\ j \neq i}}^{N_{RAS}} \log(d_{ji}) \sum_{\substack{j=1 \\ j \neq i}}^{N_{BS}} \log(d_{ji}) \cdot PL_{ji}(dB)\right)}{10\left(N_{RAS} \sum_{\substack{j=1 \\ j \neq i}}^{N_{RAS}} (\log(d_{ji}))^2 - \left(\sum_{\substack{j=1 \\ j \neq i}}^{N_{RAS}} \log(d_{ji})\right)^2\right)}}$$

where $d_{ji}$ denotes a distance between j BS and i BS, and $PL_{ji}$ denotes a pathloss between j BS and i BS.

12. The method of claim 1, wherein the increasing of the transmit power comprises setting the transmit power to the maximum transmit power.

13. The method of claim 1, wherein the increasing of the transmit power comprises increasing the transmit power more than current transmit power by a corresponding level.

14. The method of claim 1, further comprising setting to the transmit power to the minimum transmit power when it is not determined that the noise power level is higher than the interference power level.

15. The method of claim 1, further comprising decreasing the transmit power less than current transmit power by a corresponding level when it is not determined that the noise power level is higher than the interference power level.

16. An apparatus for controlling the transmit power of a mobile Base Station (BS) in a wireless communication system, the apparatus comprising:

a distance estimator configured to estimate distances (d) with neighbor BSs;

a parameter determiner configured to determine a pathloss exponent (A) and a pathloss compensation constant (B) based on the distances (d) with neighbor BSs and to determine a measurement value for determining whether a noise power level is higher than an interference power level based on the distances (d) with neighbor BSs, the pathloss exponent (A) and the pathloss compensation constant (B); and a power control determiner configured to, when the measurement value is higher than a threshold value, determine that the noise power level is higher than the interference power level and, when it is determined that the noise power level is higher than the interference power level, increase transmit power.

17. The apparatus of claim 16, further comprising a transceiver configured to measure Received Signal Strength Indications (RSSIs) of neighbor BSs and provide the RSSIs to the distance estimator, and wherein the parameter determiner estimates the pathloss exponent (A) and the pathloss compensation constant (B) based on the RSSIs of the neighbor BSs and the distances (d) with the neighbor BSs, in a Least Mean Square (LMS) method.

18. The apparatus of claim 17, wherein at least one of the distances (d) with the neighbor BS is determined based on a frame synchronization value.

19. The apparatus of claim 16, further comprising a transceiver configured to measure Received Signal Strength Indications (RSSIs) of the neighbor BSs and to provide the RSSIs to the distance estimator, wherein the parameter determiner selects a neighbor BS having the minimum receive power among the RSSIs of the neighbor BSs, wherein the parameter determiner receives at least one reports from Mobile Stations (MSs) for receive power of the selected neighbor BS and determines average receive power, and wherein the parameter determiner determines a Shadowing Factor (SF) based on the minimum receive power and the average receive power, and estimates the pathloss exponent (A) and the pathloss compensation constant (B) based on the RSSI of the selected neighbor BS and the distance (d) with the neighbor BS.

20. The apparatus of claim 19, wherein the distance estimator measures the RSSIs of the neighbor BSs and, upon receiving the RSSIs of the neighbor BSs, estimates each of the distances (d) with the neighbor BSs based on a frame synchronization value.

21. The apparatus of claim 19, wherein the distance estimator receives neighbor BS information through a backhaul, wherein the distance estimator measures an RSSI for a BS of a change of transmit power, based on the neighbor BS information, and wherein the distance estimator receives distance information with a neighbor BS based on Global Positioning System (GPS) information, through the backhaul.

22. The apparatus of claim 19, wherein the SF is calculated using the following formula:

$$SF_i(dB) = \frac{(RxP_{BSindex,i}(dB) - E[RxP_{BSindex,m}(dB)])}{\alpha} + \left(1 - \frac{1}{\alpha}\right) \cdot SF_i(dB)$$

where E[x] denotes an average value, $RxP_{BSindex,i}$ denotes minimum receive power values from neighbor BSs, $RxP_{BSindex,m}$ denotes receive power values reported by MSs, $SF_{il}$ denotes a previous SF value, and $\alpha$ denotes a weighted value.

23. The apparatus of claim 16, wherein the power control determiner determines that the noise power level is higher than the interference power level, using the following formula:

$$\min_{\substack{j \\ j \neq i}} \left(10 \cdot A \cdot \log\left(1 + \left(\frac{MaxTxP_i}{CINR_{coverage} \cdot N \cdot B}\right)^{\frac{1}{A}}\right) \bigg/ d\right) +$$

$$N(dB) - RxP_{ji}(dB) - 3 \right) \geq 0,$$

$$\{j \mid CINR_{ji} \geq CINR_{Threshold}, UsedFA_j = UsedFA_i\}$$

where i denotes a BS index of setting transmit power, j denotes a neighbor BS index, N denotes a thermal noise power, d denotes a distance between BSs, A denotes the pathloss exponent, B denotes the pathloss compensation constant, MaxTxP denotes a maximum transmit power, and $RxP_{ji}$ denotes a receive power.

24. The apparatus of claim 19, wherein the power control determiner determines that the noise power level is higher than the interference power level, using the following formula:

$$\min_{\substack{j \\ j \neq i}} \left(10 \cdot A \cdot \log\left(1 + \left(\frac{MaxTxP_i}{CINR_{coverage} \cdot N \cdot B}\right)^{\frac{1}{A}}\right) \bigg/ d\right) +$$

$$SF_i(dB) + N(dB) - RxP_{ji}(dB) - 3 \right) \geq 0,$$

$$\{j \mid CINR_{ji} \geq CINR_{Threshold}, UsedFA_j = UsedFA_i\}$$

where i denotes a BS index of setting transmit power, j denotes a neighbor BS index, N denotes a thermal noise power, SF denotes a Shadowing Factor, d denotes a distance between BSs, A denotes the pathloss exponent, B denotes the pathloss compensation constant, MaxTxP denotes a maximum transmit power, and $RxP_{ji}$ denotes a receive power.

25. The apparatus of claim 16, wherein the pathloss exponent (A) is defined using the following formula:

$$A = \frac{\left(N_{BS} \sum_{\substack{j=1 \\ j \neq i}}^{N_{BS}} \log(d_{ji}) \cdot PL_{ji}(dB) - \sum_{\substack{j=1 \\ j \neq i}}^{N_{BS}} \log(d_{ji}) \sum_{\substack{j=1 \\ j \neq i}}^{N_{BS}} PL_{ji}(dB)\right)}{10\left(N_{BS} \sum_{\substack{j=1 \\ j \neq i}}^{N_{BS}} (\log(d_{ji}))^2 - \left(\sum_{\substack{j=1 \\ j \neq i}}^{N_{BS}} \log(d_{ji})\right)^2\right)}$$

where $d_{ji}$ denotes a distance between j BS and i BS, and $PL_{ji}$ denotes a pathloss between j BS and i BS.

26. The apparatus of claim 16, wherein the pathloss compensation constant (B) is defined using the following formula:

$$B = 10^{\dfrac{\left(\sum_{\substack{j=1\\j\neq i}}^{N_{RAS}}(log(d_{ji}))^2 \sum_{\substack{j=1\\j\neq i}}^{N_{RAS}} PL_{ji}(dB) - \sum_{\substack{j=1\\j\neq i}}^{N_{RAS}} log(d_{ji}) \sum_{\substack{j=1\\j\neq i}}^{N_{3S}} log(d_{ji}) PL_{ji}(dB)\right)}{10\left(N_{RAS}\sum_{\substack{j=1\\j\neq i}}^{N_{RAS}}(log(d_{ji}))^2 - \left(\sum_{\substack{j=1\\j\neq i}}^{N_{RAS}} log(d_{ji})\right)^2\right)}}$$

where $d_{ji}$ denotes a distance between j BS and i BS, and $PL_{ji}$ denotes a pathloss between j BS and i BS.

27. The apparatus of claim 16, wherein the power control determiner sets the transmit power to the maximum transmit power.

28. The apparatus of claim 16, wherein the power control determiner increases the transmit power more than current transmit power by a corresponding level.

29. The apparatus of claim 16, wherein the power control determiner sets the transmit power to the minimum transmit power when it is not determined that the noise power level is higher than the interference power level.

30. The apparatus of claim 16, wherein the power control determiner decreases the transmit power less than current transmit power by a corresponding level when it is not determined that the noise power level is higher than the interference power level.

* * * * *